United States Patent
Nguyen et al.

(10) Patent No.: US 11,361,131 B2
(45) Date of Patent: Jun. 14, 2022

(54) METHOD FOR ESTABLISHING THE EXCITATION FORCE APPLIED BY THE SWELL INCIDENT ON A MOVABLE MEANS OF A WAVE ENERGY SYSTEM USING A MODEL OF THE DRAG FORCE

(71) Applicant: IFP Energies nouvelles, Rueil-Malmaison (FR)

(72) Inventors: Hoai-Nam Nguyen, Rueil-Malmaison (FR); Paolino Tona, Rueil-Malmaison (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 78 days.

(21) Appl. No.: 16/966,653

(22) PCT Filed: Jan. 9, 2019

(86) PCT No.: PCT/EP2019/050381
§ 371 (c)(1),
(2) Date: Jul. 31, 2020

(87) PCT Pub. No.: WO2019/149481
PCT Pub. Date: Aug. 8, 2019

(65) Prior Publication Data
US 2020/0356713 A1 Nov. 12, 2020

(30) Foreign Application Priority Data
Jan. 31, 2018 (FR) ..................................... 18/50.782

(51) Int. Cl.
*G06F 30/28* (2020.01)
*F03B 13/16* (2006.01)
(Continued)

(52) U.S. Cl.
CPC .............. *G06F 30/28* (2020.01); *F03B 13/16* (2013.01); *G01L 5/0061* (2013.01); *G01M 10/00* (2013.01); *G06F 2111/10* (2020.01)

(58) Field of Classification Search
CPC ........ G06F 30/28; G06F 2111/10; G06F 30/20; F03B 13/16; F03B 13/145; G01L 5/0061; G01M 10/00; Y02E 10/30
See application file for complete search history.

(56) References Cited

U.S. PATENT DOCUMENTS

2017/0298899 A1 10/2017 Abdelkhalik
2019/0128236 A1* 5/2019 Ringwood ............. G05B 13/04

FOREIGN PATENT DOCUMENTS

FR       3049989 A1    10/2017

OTHER PUBLICATIONS

Peter Kracht, et al., "Performance Improvement of a Point Absorber Wave Energy Converter by Application of an Observer-Based Control: Results From Wave Tank Testing," (IEEE Transactions on Industry Applications, vol. 51, No. 4, p. 3426-3434 (Year: 2015).*

(Continued)

*Primary Examiner* — Steven W Crabb
(74) *Attorney, Agent, or Firm* — Fitch, Even, Tabin & Flannery LLP (57) ABSTRACT

The present invention is a method for real-time determination of the forces exerted by incident waves on a mobile part of a wave energy system. Models are constructed of the radiation force exerted on the mobile part and of the drag force exerted on the mobile part and a non-linear model of the wave energy system dynamics. The invention uses only measurements of the float kinematics (position, velocity and possibly acceleration) and of the force applied by a converter machine, which measurements are normally available on a wave energy system since they are used for control and (Continued)

supervision thereof. Determination of the excitation force exerted by incident waves on the mobile part uses the models, the measurements and an unscented Kalman filter.

16 Claims, 2 Drawing Sheets

(51) Int. Cl.
*G01L 5/00* (2006.01)
*G01M 10/00* (2006.01)
*G06F 111/10* (2020.01)

(56) References Cited

OTHER PUBLICATIONS

Mohd Aftar Abu Bakar et al., "Unscented Kalman filtering for wave energy converters system identification," AIP Conference Proceedings 1602, 304 (Year: 2014).*
International Search Report for PCT/EP2019/050381 dated Feb. 1, 2019; English translation submitted herewith (7 pgs.).
Nguyen Hoai-Nam et al: "Dominant wave frequency and amplitude estimation for adaptive control of wave energy converters", OCEANS 2017—Aberdeen, IEEE, Jun. 19, 2017 (Jun. 19, 2017), pp. 1-6, XP033236867.

* cited by examiner

METHOD FOR ESTABLISHING THE EXCITATION FORCE APPLIED BY THE SWELL INCIDENT ON A MOVABLE MEANS OF A WAVE ENERGY SYSTEM USING A MODEL OF THE DRAG FORCE

CROSS-REFERENCE TO RELATED APPLICATIONS

Reference is made to International Application No. PCT/EP2019/050381, filed Jan. 9, 2019, which claims priority to French Patent Application Ser. No. 18/50,782, filed Jan. 31, 2018, the contents of which are incorporated herein by reference in their entirety.

BACKGROUND OF THE INVENTION

Field of the Invention

The invention relates to conversion of wave energy to electrical energy. In particular, the invention concerns the determination of the excitation force exerted by incident waves on a mobile part, notably for controlling a wave energy system.

Description of the Prior Art

Renewable energy resources have generated strong interest for some years. They are clean, free and inexhaustible, which are major assets in a world facing the inexorable depletion of the available fossil resources and recognizing the need to preserve the planet. Among these resources, wave energy which is a source relatively unknown amidst those widely publicized, such as wind or solar energy, contributes to the vital diversification of the exploitation of renewable energy sources. The devices, commonly referred to as "wave energy devices", are particularly interesting because they allow electricity to be produced from this renewable energy source (the potential and kinetic wave energy) without greenhouse gas emissions. They are particularly well suited for providing electricity to isolated island sites.

For example, patent applications FR-2,876,751 and WO-2009/081,042 describe devices intended to capture the energy produced by the sea water forces. These devices are made up of a floating support structure on which is a pendulum movably mounted with respect to the floating support. The relative motion of the pendulum with respect to the floating support is used to produce electrical energy by use of an energy conversion machine (an electrical machine for example). The conversion machine operates as a generator and as a motor. Indeed, in order to provide torque or a force for driving the mobile part, power is supplied to the converter machine to bring it into resonance with the waves (motor mode). On the other hand, to produce a torque or a force that withstands the motion of the mobile part, power is recovered via the conversion machine (generator mode).

In order to improve the efficiency and therefore the cost-effectiveness of the devices for converting wave energy into electrical energy (wave energy systems), it is interesting to estimate the excitation force exerted by incident waves on the wave energy system.

The force applied by the waves to the devices for converting wave energy into electrical energy or other forms of exploitable energy, commonly referred to as wave energy devices, cannot be directly measured under normal operating conditions in an industrial context. For some wave energy systems, it is possible to carry out specific tests which lock the floating part of the machine and measure the force required to counteract the action of the waves (i.e. to keep the float stationary) by use of one or more (force or torque) sensors arranged on the conversion machine, also referred to as power take-off (PTO) system, which for example are an electrical generator provided with a device allowing the oscillating motion of the mobile part to be transmitted. According to the common terminology, the quantity thus measured is referred to as excitation force of the wave motion, by differentiating it notably from the force (and the wave motion) generated by the very motion of the float (radiation force). On the other hand, during normal operation of the float, the some force sensors only measure the force applied by the PTO, and not by the excitation force of the incident waves.

In principle, it would be possible to calculate all the forces applied by the waves by integrating pressure measurements provided by sensors distributed all over the surface, but this solution is expensive and not very robust, it would therefore be difficult to envisage in an industrial context.

There Is little scientific work in the field of real-time estimation of the excitation force (or torque) of the waves. The document Peter Kracht, Sebastian Perez-Becker. Jean-Baptiste Richard. and Boris Fischer. "Performance Improvement of a Point Absorber Wave Energy Converter by Application of an Observer-Based Control: Results from Wave Tank Testing" is mentioned by way of example. IEEE Transactions on Industry Applications, July 2015, describes a wave force estimation algorithm based on a bank of independent harmonic oscillators and a Luenberger observer. The results obtained with this method show that the estimations are significantly delayed (phase shifted) in relation to the true excitation force, which is annoying notably for use within the context of wave energy system control. More generally, this approach considers an (a-priori selected) frequency range of fixed frequency for the wave spectrum. For the method to work under realistic conditions, where the spectrum is time variant, a very large number of frequencies needs to be taken into account, so that this approach imposes a heavy computational burden. The document Bradley A. Ling. "Real-Time Estimation and Prediction of Wave Excitation Forces for Wave Energy Control Applications", published in ASME 2015, $34^{th}$ International Conference on Ocean, Offshore and Arctic Engineering, provides an approach based on an extended Kalman filter for reconstructing the spectrum by considering the wave excitation force as a (single) sine wave whose parameters (amplitude, frequency and phase) vary over time. However, the method can only be effective for waves within a very narrow frequency band.

Furthermore, patent application FR-2,973,448 corresponding to U.S. Pat. No. 9,261,070 describes a control method for oscillating point converters. One step estimates (the spectrum of) the wave force on the float (or of the torque on the mobile part of the converter), from a set of sine waves and a Luenberger observer. The method is similar to the one published in the aforementioned documents, and it involves a priori the same drawbacks.

Another method is described in patent application FR-3,049,989 (WO-2017/174,244). This method determines in real time the forces exerted by incident waves on the mobile part, in order to adopt the best adjustments for electrical energy production strategies. The method is based on the construction of a model of the radiation force exerted on the mobile part and of a model of the wave energy system dynamics. This method only uses measurements of the float kinematics (position, velocity and possibly acceleration) and of the force applied by the converter machine, which measurements are normally available on a wave energy system since they are used for control and supervision thereof. Thus, the used models allow estimating the force exerted by the waves for any wave frequency range, while keeping a computation time suited to real-time determination and control.

This method performs satisfactorily for "linear" wave energy systems, that is whose dynamic behavior is described in a sufficiently precise manner by linear differential equations. However, this method does not allow the wave force to be determined precisely for "non-linear" wave energy systems (with non-linear differential equations), notably flop type wave energy systems or wave energy systems of flat submerged pressure differential converter type, or wave energy systems of surface floating rotating mass device type.

SUMMARY OF THE INVENTION

In order to overcome these drawbacks, the present invention concerns a method for real-time determination of the forces exerted by incident waves on a mobile part of a wave energy system, in order to adopt the best adjustments for electrical energy recovery strategies. The method is based on the construction of a model of the radiation force exerted on the mobile part, a model of the drag force exerted on the mobile part and of a non-linear model of the wave energy system dynamics. The invention uses only measurements of the float kinematics (position, velocity and possibly acceleration) and of the force applied by the conversion machine, which measurements are normally available on a wave energy system since they are used for control and supervision thereof. Determination of the excitation force exerted by incident waves on the mobile part uses these models, the measurements and an unscented Kalman filter. It notably integrates a model of the viscous drag force and it allows, by use of the unscented Kalman filter, estimation of the force exerted by incident waves in a precise manner for all wave energy systems, in particular the "non-linear" wave energy systems. The method according to the invention is suited for any wave frequency range, while providing a a computation time suited for real-time determination and control.

The present invention relates to a method of determining an excitation force exerted by the waves on a mobile part of a wave energy system. The wave energy system converts the wave energy into to electrical energy through the mobile part cooperating with a conversion machine, the mobile part moving with respect to the conversion machine under the action of the waves. For this method, the following steps are carried out:
a) measuring the position and the velocity of the mobile part;
b) measuring the force u exerted by the converter machine on the mobile part;
c) constructing a model of the radiation force $\tau_{rad}$ exerted on the mobile part, the radiation force model relating the radiation force $\tau_{rad}$ to the velocity of the mobile part;
d) constructing a model of the drag force $\tau_d$ exerted on the mobile part, the drag force model relating the drag force $\tau_d$ to the velocity of the mobile part;
e) constructing a dynamic model of the wave energy system relating the excitation force $\tau_w$ exerted by the incident waves on the mobile part to the position of the mobile part, to the velocity of the mobile part, to the force u exerted by the conversion machine on the mobile part, to the radiation force $\tau_{rad}$ exerted on the mobile part and to the drag force $\tau_d$ exerted on the mobile part; and
f) determining the excitation force $\tau_w$ exerted by incident waves on the mobile part using the dynamic model, the radiation force model, the drag force $\tau_d$ model, the measured position and velocity, and the measured force u exerted by the conversion machine on the mobile part, and using an unscented Kalman filter constructed from a random walk model of the excitation force exerted by the incident waves on the mobile part.

According to an embodiment, the dynamic model of the wave energy system is constructed by use of an equation: $I_{eq}\ddot{\delta}(t) = \tau_{hd}(t) + \tau_{rad}(t) + \tau_d(t) + \tau_w(t) - u(t)$, with $I_{eq}$ being the total moment of inertia of the mobile part (2), $\delta(t)$ being the angle of rotation of the mobile part with respect to the equilibrium position, with $\ddot{\delta}(t)$ being the angular acceleration of the mobile part and $\dot{\delta}(t)$ the angular velocity of the mobile part, $\tau_{hd}(t)$ being the hydrostatic restoring moment, $\tau_{rad}(t)$ being the radiation moment, $\tau_d(t)$ being the drag moment, $\tau_w(t)$ being the wave excitation moment and u(t) being the moment exerted by the conversion machine on the mobile part.

According to on implementation, hydrostatic restoring moment $\tau_{hd}(t)$ is determined by use of a formula:

$$\tau_{hd}(t) = -K\delta(t)$$

where K is the hydrostatic stiffness coefficient.

According to an aspect, the radiation force model is constructed by use of an equation of the type: $\tau_{rad}(t) = -I_\infty \ddot{\delta}(t) - \tau_r(t)$, with $I_\infty$ being the added moment of inertia at infinite high frequency; and $\tau_r(t) = \int_0^t h(t-s)\dot{\delta}(s)ds = h(t)*d(t)$, with h being the impulse response relating the velocity of the mobile part to the radiation damping and d(t) being the angular velocity of the mobile part.

Advantageously, the drag force model is constructed by use of an equation of the type:

$$\tau_d(t) = \beta \dot{\delta}(t) |\dot{\delta}(t)|$$

where β is the drag coefficient and $\dot{\delta}(t)$ is the angular velocity of the mobile part.

Alternatively, the drag force model $F_d$ can be written by use of an equation of the type:

$$F_d(t) = \beta \dot{z}(t) |\dot{z}(t)|$$

with β being the drag coefficient and $\dot{z}$ being the velocity of the mobile port.

According to an implementation, the excitation force $\tau_w$ exerted by the incident waves on the mobile part is determined by carrying out the following steps:
i) initializing k=0, state vector $\hat{x}_a(0|0)=m(0)$ and the state of the covariance matrix $P(0|0)=P_0$;
ii) at any time k, acquiring the position and velocity measurements of the mobile part $y(k)=[\delta(k)\ \dot{\delta}(k)]$ and the measurement of the force exerted by the converter machine on the mobile part u(k); and
iii) at any time k, determining the excitation force exerted by the incident waves on the mobile part (2) $\hat{\tau}_w(k)$ by use of the following equations:

$$\hat{\tau}_w(k) = [0\ 1]\hat{x}_a(k|k)$$

$$P_x(k|k) = P_x(k|k-1) - KP_y(k|k-1)K^T$$

-continued $$K = P_{xy}(k \mid k-1) P_y(k \mid k-1)^{-1}$$

$$\hat{x}(k) = \hat{x}_a(k \mid k-1) + K(\hat{y}(k) - \hat{y}(k \mid k-1))$$

$$P_{xy}(k \mid k-1) = \sum_{j=0}^{2n} W_j^e (\hat{x}_j(k \mid k-1) - x_a(k \mid k-1))(\hat{y}_j(k \mid k-1) - y(k \mid k-1))^T$$

$$\hat{y}(k \mid k-1) = \sum_{j=0}^{2n} W_j^m \hat{y}_j(k \mid k-1),$$

$$P_y(k \mid k-1) = \sum_{j=0}^{2n} W_j^e (\hat{y}_j(k \mid k-1) - y(k \mid k-1))(\hat{y}_j(k \mid k-1) - y(k \mid k-1))^T + R$$

$$\hat{y}_j(k \mid k-1) = C_a \hat{x}_j(k \mid k-1)$$

$$\hat{x}(k \mid k-1) = \sum_{j=0}^{2n} W_j^m \hat{x}_j(k \mid k-1),$$

$$P_x(k \mid k-1) = \sum_{j=0}^{2n} W_j^e (\hat{x}_j(k \mid k-1) - x_a(k \mid k-1))(\hat{x}_j(k \mid k-1) - x_a(k \mid k-1))^T + Q$$

$$\hat{x}_j(k \mid k-1) = A_a x_j(k-1) + f_a(x_j(k-1)) + B_a u(k-1), j = 0, 1, \ldots, 2n$$

$$x_0(k-1) = \hat{x}_a(k-1 \mid k-1),$$

$$x_i(k-1) = \hat{x}_a(k-1 \mid k-1) + \sqrt{n+\lambda} S_i(k-1), i = 1, 2, \ldots, n$$

$$x_{i+n}(k-1) = \hat{x}_a(k-1 \mid k-1) - \sqrt{n+\lambda} S_i(k-1), i = 1, 2, \ldots, n$$

where $S_i(k-1)$ is the i-th column of the matrix square root of $P_x(k-1|k-1)$, that is $P_x(k|k-1)=S(k-1)^T S(k-1)$.

$x_a(k)$ being the unknown state vector $$x_c(k) = \begin{bmatrix} x(k) \\ \tau_w(k) \end{bmatrix},$$

$A_a, B_a, C_a, D_a$ matrices of the state-space realization, P being the covariance matrix of the state vector, Q and R calibration matrices.

According to on embodiment, the wave energy system is controlled depending on the determined excitation force $\tau_w$ exerted by the incident waves on the mobile part.

Advantageously, the wave energy system is a wave energy system of a flat submerged pressure differential converter construction or of surface floating rotating mass device type, or a flop type wave energy system.

Furthermore, the invention relates to a wave energy system. It comprises control, notably computer control, implementing a method according to one of the above features.

BRIEF DESCRIPTION OF THE DRAWINGS

Other features and advantages of the method according to the invention will be clear from reading the description hereafter, with reference to the accompanying figures wherein.

DETAILED DESCRIPTION OF THE INVENTION

The present invention relates to a method of determining the excitation force exerted by Incident waves on a mobile port of a wave energy system, which is also referred to as wave excitation force. A wove energy system is a system that converts wave energy to recoverable energy, in particular electrical energy. A wave energy system generally comprises a mobile part, also referred to as flap, pendulum or float, which has an oscillating motion under the action of the waves. The mobile port cooperates with a conversion machine, also referred to as a power take-off (PTO) system, which comprises in most cases an electrical generator coupled to a device allowing adoption of the transmission of the oscillating motion, in order to convert the motion of the mobile part into recoverable energy. In some cases, the conversion machine can act as a motor by generating a force on the mobile port. Indeed, in order to recover power via the conversion machine, a torque or a force is produced opposing the motion of the mobile (generator mode). Furthermore, if the conversion machine allows, power can be supplied to the conversion machine to provide torque or a force for driving the mobile part in order to bring it into resonance with the waves (motor mode).

The method according to the invention is suited for any type of wave energy system with at least one mobile port, as described for example in patent application FR-2,973,448 corresponding to U.S. Pat. No. 9,261,070. The control method according to the invention can also be applied to a wave energy system belonging to the category of wave energy systems with oscillating water columns (OWC). However, the method according to the invention is particularly suited for a non-linear wave energy system, for example of flap construction, of flat submerged pressure differential converter construction or of surface floating rotating mass construction.

Figure 1:
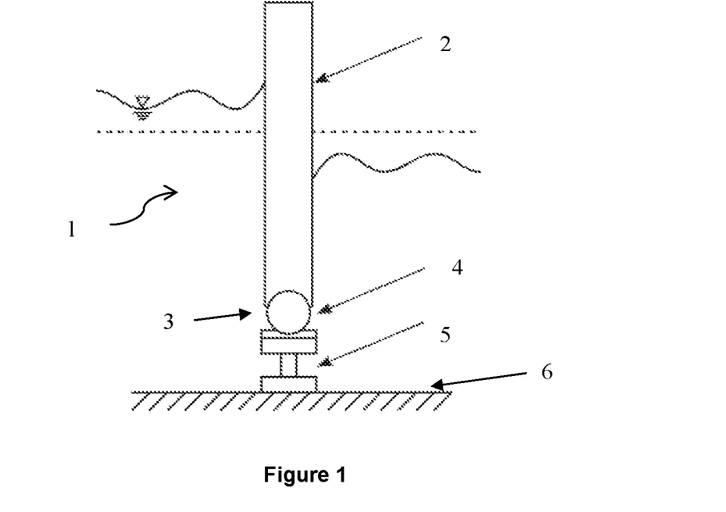
FIG. 1 illustrates a flop construction wove energy system according to on embodiment of the invention.

FIG. 1 schematically illustrates a non-limitative example of a flap design wave energy system 1. Wave energy system 1 comprises a mobile part 2 in a form of a substantially vertical flap (the wave motion is schematically represented by two curved lines and the direction of the waves is shown by arrow H). Flap 2 has a submerged part and an emerged part. Mobile part 2 cooperates, through a hinge 4, with a converter machine based on an electrical generator 3, which is in this case a rotary generator. Hinge 4 allows a rotary oscillating motion of flop 2 about a horizontal axis with respect to a support 5 that is stationary with respect to the seabed 6.

In the rest of the description, the terms waves, sea waves and wave motion are considered to be equivalent.

Furthermore, in the description, the term force designates a stress or a torque. Similarly, the terms position, velocity and acceleration designate both "linear" and "angular" values. The "linear" values can be associated with the stress and the "angular" values can be associated with the torque. In the rest of the description, only the case relative to torques is illustrated, but the stress-related case can be deduced by transposing the equations to an orthogonal reference frame.

Moreover, for a better understanding, the various models are represented in one dimension. The method according to the invention is suited for models in several dimensions, for systems whose motion has several degrees of freedom.

The method according to the invention comprises the following steps:
1. Measurement of the mobile part's position and velocity
2. Measurement of the force exerted by the converter machine (or PTO)
3. Construction of the radiation force model
4. Construction of the drag force model
5. Construction of the dynamic model
6. Determination of the incident wave excitation force
7. (optional step) Control of the wave energy system.

Steps 3 and 4 can be carried out in this order, in the reverse order or simultaneously.

The steps of the method can be carried out by a computer (or calculator). The computer can comprise data processing and, advantageously, data storage.

The data processors are configured to implement:
measurement of the mobile part's position and velocity.
measurement of the force exerted by the converter machine,
construction of the radiation force, drag force and dynamic models, and
determination of the incident wave excitation force.

1—Measurement of the Mobile Part's Position and Velocity

This step measures the position and the velocity of the mobile part. The position corresponds to the motion (distance or angle for example) with respect to the position of equilibrium of the mobile part. These measurements can be performed using sensors, generally present on a wave energy system for at least one of control and supervision thereof.

According to an implementation of the invention, this step can also include measuring the acceleration of the mobile part, which can be used to estimate the velocity, or directly in the models used by the method according to the invention. For example, acceleration can be measured using on accelerometer arranged on the mobile part.

2—Measurement of the Force Exerted by the Converter Machine (PTO)

The force (the stress or possibly the torque) exerted by the PTO converter machine on the mobile part is measured in this step. This measurement can be performed using a sensor, which can be a force sensor or a torque sensor. This type of sensor is often installed or it can be readily installed in wave energy systems, for at least one of control and supervision thereof. Alternatively, the measurement con be replaced by an estimation performed from the force (or torque) setpoint sent to the PTO.

For the wave energy system example illustrated in FIG. 1, a torque sensor can be arranged at hinge 4 (or electrical generator 3).

3—Construction of the Radiation Force Model

This step constructs a model of the radiation force exerted on the mobile part. According to the linear wave theory (as described for example in the document Folnes J, Kumiawan A. "Fundamental formulae for Wave-Energy Conversion". R. Soc. open sci. 2: 140305, 2005, http://dx.doi.org/10.1098/rsos.140305), the radiation force results from the oscillation of a submerged body (therefore is depends on the motion of the mobile part), while the excitation force, resulting from the very presence of a body in the water, does not depend on the motion of the submerged body, but is dependent on the incident wave. In the absence of incident wave, the radiation force damps the residual oscillation of the submerged body and eventually stops it. It is important to note that, although the linear theory allows relating the excitation force to the elevation of the incident wave through a linear model (in the frequency or time domain), in practice it cannot be used to calculate the excitation force online, even though it is possible to measure the elevation of the wave at the center of gravity of the mobile part as required by the theory. Indeed, the linear relation between wave elevation and excitation force is non-causal, which means that the excitation force at a given time cannot be calculated without knowing the wave elevation in future times (on the other hand, calculation can be carried out offline, once the wave has passed). In a real-time control context, the excitation force can therefore only be considered as a totally unknown exogenous force acting on the float. On the other hand, still according to the linear wave theory, the radiation force is related to the motion of the float, and more precisely to the acceleration and the velocity thereof, by a causal linear model (in the frequency or time domain). It can therefore be calculated online using the current acceleration measurements and the current and past velocity measurements.

According to an implementation of the invention, the radiation force model $\tau_{rad}(t)$ is constructed by use of an equation:

$$\tau_{rad}(t) = -I_\infty \ddot{\delta}(t) - \tau_r(t)$$

with:
$\tau_r(t) = \int_0^t h(t-s)\dot{\delta}(s)ds = h(t) * \dot{\delta}(t)$ the component of the radiation force $\tau_{rad}$ that depends on the (current and past) velocity of the mobile part, which can be referred to as radiation damping;
$\ddot{\delta}$ is the angular acceleration of the mobile part;
$I_\infty$ is the added moment of inertia at infinite high frequency, which can be obtained using BEM (Boundary Element Method) calculation codes, such as WAMIT® (WAMIT, USA) or Nemoh® (Ecole Centrale de Nantes, France), from the geometry of the mobile part;
$\dot{\delta}$ is the angular velocity of the mobile part: and
h is the impulse response relating the velocity of the mobile part to the radiation damping, whose coefficients are obtained from hydrodynamic parameters of the mobile part calculated with the same BEM calculation codes.

The construction of this model allows determination of radiation force at any time, with a limited computation time. Thus, determination of the force exerted by the waves can be determined at any time with a short computation time.

4—Construction of the Drag Force Model

This step constructs a model of the drag force exerted on the mobile part. The drag force corresponds to the viscous friction on the mobile part of the wave energy system. It is a non-linear model that can depend on the velocity of the mobile port. The drag force (due to viscous friction) is often considered to be negligible for wove energy systems of oscillating point converter type and it is generally excluded from the modelling thereof. This is not the case, however, for flap construction wave energy systems or for machines such as flat submerged pressure differential converters or surface floating rotating mass devices, among others.

According to an embodiment of the invention, for a wave energy system having a rotational motion, the drag force model $T_d$ can be written with an equation:

$$\tau_d(t)=\beta\dot{\delta}(t)|\dot{\delta}(t)|$$

with $\beta$ being the drag coefficient, this coefficient can be determined by experimental tests of the wave energy system or CFD type (Computational Fluid Dynamics) numerical simulations; and $\dot{\delta}$ a being the angular velocity of the mobile part.

According to a variant embodiment of the invention, for a wave energy system having a translational motion, the drag force model $F_d$ can be written with an equation:

$$F_d(t)=\beta\dot{z}(t)|\dot{z}(t)|$$

with $\beta$ being the drag coefficient which can be determined by experimental tests of the wave energy system or CFD type (Computational Fluid Dynamics) numerical simulations, and $\dot{z}$ being the velocity of the mobile part.

The construction of this model enables precise determination of the drag force. Thus, determination of the force exerted by the waves on the mobile part can be precise because it does not disregard the drag force.

5—Construction of the Dynamic Model of the Wave Energy System

This step constructs a dynamic model of the wave energy system. A dynamic model is understood to be a model that relates the excitation force exerted by the incident waves on the mobile part, the radiation force exerted on the mobile part, the hydrostatic restoring force exerted on the mobile part, the force exerted by the converter machine on the mobile port, to the position and the velocity of the mobile part. This type of model allows obtaining results representative of the behavior of the wave energy system if the motions are not too large.

Advantageously, the dynamic model is obtained by applying the fundamental principle of dynamics (Newton's second law) to the mobile part.

According to an embodiment of the invention wherein the stresses are considered, the dynamic model of the wave energy system can be constructed with an equation:

$$I_{eq}\ddot{\delta}(t)=\tau_{hd}(t)+\tau_{rad}(t)+\tau_d(t)+\tau_w(t)-u(t)$$

with:

$I_{eq}$ being the moment of inertia of the mobile part, $\ddot{\delta}$ being the angular acceleration of the mobile part, $\tau_w$ being the excitation torque exerted by the incident waves on the mobile part, $\tau_{rad}$ being the radiation torque exerted on the mobile part, $\tau_{hd}$ being the hydrostatic restoring torque exerted on the mobile part, $\tau_d$ being the drag torque exerted on the mobile part, and u being the torque exerted by the converter machine on the mobile part.

This model conveys a rotational motion about a horizontal axis (typical for the wave energy system of FIG. 1). This model is derived from the linear wave theory.

According to a first variant embodiment, the hydrostatic restoring force exerted on the mobile part can be approximated by a linear function of position z defined with respect to the equilibrium position. In this case, the hydrostatic restoring force can be written by a function of the type: $\tau_{hd}(t)=-K\delta(t)$, with $\delta$ being the angular position of the mobile part defined with respect to its equilibrium position and K the hydrostatic stiffness coefficient. Thus, the hydrostatic restoring force can be calculated from a simple model if the measurement of position $\delta$ is available. This function is particularly well-suited for small displacements $\delta$.

According to an implementation of the invention wherein the stresses are considered, the dynamic model of the wave energy system can be constructed with an equation:

$$M\ddot{z}(t)=F_{ex}(t)+F_{hd}(t)+F_{rad}(t)+F_d(t)-F_u(t)$$

with:

M being the mass of the mobile part, $\ddot{z}$ being the acceleration of the mobile part, $F_{ex}$ being the excitation force exerted by the incident waves on the mobile part, $F_{rad}$ being the radiation force exerted on the mobile part, $F_{hd}$ being the hydrostatic restoring force exerted on the mobile part, $F_d$ being the drag force exerted on the mobile part, and $F_u$ being the force exerted by the converter machine on the mobile part.

This model conveys a vertical translational motion (typical of floats having a heave motion). This model is derived from the linear wave theory.

This model is the "mirror" of the model when the torques are considered; the various terms of the model are similar in nature.

According to an embodiment of the invention, at least one of the hydrostatic restoring force and the hydrostatic restoring torque can be approximated by a linear function or by a piecewise affine function.

6—Determination of the Excitation Force Exerted by the Incident Waves

In this step, real-time determination of the excitation force exerted by the incident waves on the mobile part is performed by means of:

the mobile part's position and velocity (and possibly acceleration) measurements determined in step 1;

the measurement of the force exerted by the converter machine PTO on the mobile part determined in step 2;

the radiation force model determined in step 3;
the drag force model determined in step 4; and
the wave energy system dynamic model determined in step 5.

According to the invention, the excitation force exerted by the incident waves on the mobile part is determined using an observer based on an unscented Kalman filter (UKF) constructed from a random walk model of the excitation force exerted by the incident waves on the mobile part. The unscented Kalman filter allows accounting for the non-linearities of the models, in particular the drag force model.

It is noted that a state observer, or state estimator, is, in automation and systems theory, on extension of a model represented as a state-space representation. When the state of the system is not measurable, on observer allowing the state to be reconstructed from a model is constructed.

A UKF filter is based on the "unscented" transformation theory, which allows an estimator to be obtained for a non-linear system without requiring prior linearization for application to the filter. The UKF filter uses a statistical state distribution that is propagated through the non-linear equations. Such a filter has the advantage of providing estimation stability and therefore robustness.

For this embodiment, what is known prior to this step thus is:
- the mobile part's position $\delta$ and velocity $\dot\delta$ measurements,
- the measurement of force u exerted by the conversion machine PTO on the mobile part,
- the radiation force model $\tau_{rad}(t) = -I_\infty \ddot\delta(t) - \tau_r(t)$, with $\tau_r(t) = \int_0^t h(t-s)\dot\delta(s)ds = h(t) * \dot\delta(t)$,
- the drag force model $\tau_d(t) = \beta\dot\delta(t)|\dot\delta(t)|$, and
- the wave energy system dynamic model $I_{eq}\ddot\delta(t) = \tau_{hd}(t) + \tau_{rad}(t) + \tau_d(t) + \tau_w(t) - u(t)$.

In this approach, the problem of estimation of the wave excitation force is transformed into a conventional state estimation problem (that can be solved with an unscented Kalman filter), by expressing the dynamics of the wave excitation force by a random walk model. The main advantage of this method is the consideration of uncertainties allowing accounting for of the measurement noises and the modelled dynamics.

By replacing in the equation that describes the motion of the mobile part $$I_{eq}\ddot\delta(t) = \tau_{hd}(t) + \tau_{rad}(t) + \tau_d(t) + \tau_w(t) - u(t)$$

the expressions for the hydrostatic restoring force (with the linear model), the radiation force model and the drag force model $$\tau_{hd}(t) = -K\delta(t)$$

$$\tau_{rad}(t) = -I_\infty \ddot\delta(t) - \tau_r(t)$$

$$\tau_d(t) = \beta\dot\delta(t)|\dot\delta(t)|$$

the following non-linear model is obtained:

$$(I_{eq}+I_\infty)\ddot\delta(t) + \beta\dot\delta(t)|\dot\delta(t)| + K\delta(t) = \tau_w(t) + \tau_r(t) - u(t).$$

This equation con be put in state form, by defining $$\begin{cases} x_1(t) = \delta(t) \\ x_2(t) = \dot\delta(t) \end{cases}$$

which allows the previous model to be written in form of a state-space representation $$\begin{cases} \hat{x}_1(t) = x_2(t) \\ \hat{x}_1(t) = \dfrac{1}{I_{eq}+I_{oc}}(-Kx_1(t) - \beta x_2(t)|x_2(t)| - \tau_r(t) + \tau_w(t) - u(t)) \end{cases}$$

This system of equations contains the integral term $$\tau_r(t) = \int_0^t h(t-s)\dot\delta(s)ds = h(t) * \dot\delta(t)$$

that can be considered to be a linear system, with $\dot\delta(t)$ as the input and $\tau_r(t)$ as the output. With Prony's method, this system can then be transformed into the equivalent state-space representation:

$$\begin{cases} \hat{x}_r(t) = A_r x_r(t) + B_r \delta(t) \\ \tau_r(t) = C_r x_r(t) + D_r \delta(t) \end{cases}$$

or $$\begin{cases} \hat{x}_r(t) = A_r x_r(t) + B_r x_2(t) \\ \tau_r(t) = C_r x_r(t) + D_r x_2(t) \end{cases}$$

where $x_r$ is an internal state (inaccessible) with no particular physical meaning and $(A_r, B_r, C_r, D_r)$ are the matrices of the state-space realization.

By combining the two state-space representations. It is obtained:

$$\begin{cases} \dot{x}_1(t) = x_2(t) \\ \dot{x}_1(t) = \dfrac{1}{I_{eq}+I_{oc}}(-Kx_1(t) - D_r x_2(t) - C_r x_r(t) - \beta x_2(t)|x_2(t)| + \tau_w(t) - u(t)) \\ \dot{x}_r(t) = B_r x_2(t) + A_r x_r(t) \end{cases}$$

or, in an equivalent manner $$\begin{cases} \dot{x}(t) = A_c x(t) + f_c(x(t)) + B_c(\tau_w(t) - u(t)) \\ y(t) = C_c x(t) \end{cases}$$

where $$x(t) = [x_1(t)\ x_2(t)\ x_r^T(t)]^T$$

$$y = \begin{bmatrix} x_1(t) \\ x_2(t) \end{bmatrix}$$

and $$A_c = \begin{bmatrix} 0 & 1 & 0 \\ -\frac{K}{I_{eq}+I_{oc}} & -\frac{D_r}{I_{eq}+I_{oc}} & -\frac{C_r}{I_{eq}+I_{oc}} \\ 0 & B_r & A_r \end{bmatrix},$$

$$f_c(x(t)) = \begin{bmatrix} 0 \\ -\frac{\beta}{I_{eq}+I_{oc}} x_2(t)|x_2(t)| \\ 0 \end{bmatrix}$$

$$B_c = \begin{bmatrix} 0 \\ \frac{1}{I_{eq}+I_{oc}} \\ 0 \end{bmatrix}, C_c = \begin{bmatrix} 1 & 0 & 0 \\ 0 & 1 & 0 \end{bmatrix}$$

Because of the term $f_c(x(t))$, the system is non-linear. The system has two inputs, $\tau_w(t)$ and $u(t)$, and two outputs, $x_1(t)=\delta(t)$ and $x_2(t)=\dot{\delta}(t)$. Input $\tau_w(t)$ is not measurable and it is unknown. The problem to be solved is to estimate it from the measured quantities $u(t)$ (moment applied by the converter machine PTO), $\delta(t)$ and $\dot{\delta}(t)$ (angular position and velocity of the mobile part).

If the principal motion of the wove energy system were a translational motion and the problem was to estimate the wave excitation force, the some developments would apply by replacing angular position and velocity with positions and velocities, and all the moments with forces.

To carry out the estimation, the above state system is first discretized (because the measurements are sampled and the estimation algorithm is executed by a calculator) using the Euler method, which yields, for a given sampling period $T_s$:

$$\begin{cases} x(k+1) = A_d x(k) + f_d(x(k)) + B_d \tau_w(k) - B_d u(k) \\ y(k) = C_d x(k) \end{cases}$$

where $A_d=I+T_s$, $f_d(x(k))=T_s f_c(x(k))$, $B_d=T_s B_c$, $C_d=C_c$ and I is the identity matrix of appropriate dimensions.

To estimate excitation moment $\tau_w(k)$, it is considered as a state, by introducing a mathematical model that relates $\tau_w(k)$ and $\tau_w(k+1)$, in this case:

$$\tau_w(k+1)=\tau_w(k)+\epsilon_m(k)$$

where $\epsilon_m(k)$ describes the variation of $\tau_w(k)$ and is considered to be a random number. In other words, this model implies that, at any time k, the excitation moment strays by a random step (quantity) from its previous value, and that these steps are independently and identically size distributed.

This random walk model of the excitation force is coupled with a more realistic model of the mobile part dynamics:

$$\begin{cases} x(k+1) = A_d x(k) + f_d(x(k)) + B_d \tau_w(k) - B_d u(k) + \epsilon_x(k) \\ y(k) = C_d x(k) + v(k) \end{cases}$$

where $\epsilon_x(k)$ represents the unmodelled dynamics (PTO friction, hydrostatic non-linearity, etc.) and $v(k)$ describes the measurement noise corrupting the float position and velocity measurements.

By combining the random walk model of the excitation force and the non-linear dynamics of the mobile part, the augmented system is obtained:

$$\begin{cases} x(k+1) = A_d x(k) + f_d(x(k)) + B_d \tau_w(k) - B_d u(k) + \epsilon_x(k) \\ w(k+1) = \tau_w(k) + \epsilon_m(t) \\ y(k) = C_d x(t) + v(k) \end{cases}$$

or, in an equivalent manner:

$$\begin{cases} x_a(k+1) = A_a x_a(k) + f_a(x_a(k)) + B_a u(k) + \epsilon(k) \\ y(k) = C_a x_a(k) + v(k) \end{cases}$$

where $$x_a(k) = \begin{bmatrix} x(k) \\ \tau_w(k) \end{bmatrix}, f_a(x_a(k)) = \begin{bmatrix} f_d(x(k)) \\ 0 \end{bmatrix}, \epsilon(k) = \begin{bmatrix} \varepsilon_x(k) \\ \varepsilon_m(k) \end{bmatrix}$$

and $$A_a = \begin{bmatrix} A_d & B_d \\ 0 & 1 \end{bmatrix}, B_a = \begin{bmatrix} -B_d \\ 0 \end{bmatrix}, C_a = [C_d\ 0]$$

Thus, the problem to be estimated, $\tau_w(k)$, becomes a state estimation problem.

One way of estimating the unknown state vector $x_a(k)$, which is by considering information on $\epsilon(k)$ and $v(k)$, applies the Kalman filter (KF) algorithm. In this proposed method, the unscented Kalman filter (UKF) is used for handling the non-linearity of the system. The UKF is generally more robust and precise than the extended Kalman filter (EKF), which deals with the non-linearity by linearizing it. Furthermore, in this case, the presence of the drag term, whose derivative is not continuous, makes the EKF inapplicable.

Like the EKF, the UKF performs the estimation in two steps, state prediction and measurement correction, except that these two steps are preceded by a prior step for "sigma points" calculation. The sigma points are a set of samples calculated so as to be able to exactly propagate the mean and variance information in the space of a non-linear function.

According to an implementation of the invention, the following hypotheses can be adopted:
- the initial state $x_a(0)$ is a random vector of mean $m(0)=E[x_a(0)]$ and of covariance $P(0)=E[(x_a(0)-m(0))(x_a(0)-m(0))^T]$,
- $\epsilon(k)$ and $v(k)$ are Gaussian noises with covariance matrices Q and R respectively, as well as the following notations:
- $\hat{x}_a(k|k-1)$ is the estimation of $x_a(k)$ from measurements up to the time k−1, i.e. y(k−1), y(k−2), . . . and u(k−1), u(k−2), . . .
- $\hat{x}_a(k|k)$ is the estimation of $x_a(k)$ from measurements up to the time k, i.e. y(k), y(k−1) . . . and u(k), u(k−1), . . .
- $P_x(k|k-1)$ is the covariance matrix of $x_a(k)$ from measurements up to the time k−1, i.e. y(k−1), y(k−2), . . . and u(k−1), u(k−2), . . .
- $P_x(k|k)$ is the covariance matrix of x(k) from measurements up to the time k, i.e. y(k), y(k−1) . . . and u(k), u(k−1), . . .

For this implementation, the three steps in the UKF method can be:

1. Calculation of the Sigma Points Let:

$$W_0^m = \frac{\lambda}{n+\lambda},$$
$$W_0^c = \frac{\lambda}{n+\lambda} + (1 - a^2 + \gamma),$$
$$W_j^m = W_j^c = \frac{\lambda}{2(n+\lambda)}, j = 1, 2, \ldots, 2n$$

where $\lambda=(\alpha^2-1)n$ is a scaling parameter, n is the dimension of the state $x_a(k)$, $\alpha$ is a parameter that determines the spread of the sigma points around x(k−1|k−1), which is generally assigned a small positive value, $10^{-3}$ for example, $\gamma$ is a parameter used to incorporate a priori knowledge on the distribution of x: for a Gaussian distribution, $\gamma=2$ is optimal.

At the time k−1, the following selection of sigma points (set of points encoding exactly the mean and covariance information is considered):

$$x_0(k-1)=\hat{x}_a(k-1|k-1),$$
$$x_i(k-1)=\hat{x}_a(k-1|k-1)+\sqrt{n+\lambda}S_i(k-1), i=1,2,\ldots,n$$
$$x_{i+n}(k-1)=\hat{x}_a(k-1|k-1)-\sqrt{n+\lambda}S_i(k-1), i=1,2,\ldots,n$$

where $S_i(k-1)$ is the i-th column of the matrix square root of $P_x(k-1|k-1)$, that is $P_x(k|k-1)=S(k-1)^T S(k-1)$.

2. Prediction Update

Each sigma point is propagated through the non-linear model representing the evolution of the states:

$$\hat{x}_j(k|k-1)=A_a x_j(k-1)+f_a(x_j(k-1))+B_a u(k-1),$$
$$j=0,1,\ldots,2n$$

The mean and the covariance of $\hat{x}_a(k|k-1)$, the prediction of $x_a(k|k-1)$ are calculated as $$\hat{x}(k|k-1) = \sum_{j=0}^{2n} W_j^m \hat{x}_j(k|k-1),$$

$$P_x(k|k-1) = \sum_{j=0}^{2n} W_j^c (\hat{x}_j(k|k-1) - x_a(k|k-1))(\hat{x}_j(k|k-1) - x_a(k|k-1))^T + Q$$

The predicted states $\hat{x}_j(k|k-1)$ are used in the output state equation, which yields:

$$\hat{y}_j(k|k-1)=C_a R_j(k|k-1)$$

The mean and the covariance of $\hat{y}(k|k-1)$ are calculated as $$\hat{y}(k|k-1) = \sum_{j=0}^{2n} W_j^m \hat{y}(k|k-1),$$

$$P_y(k|k-1) = \sum_{j=0}^{2n} W_j^c (\hat{y}_j(k|k-1) - y(k|k-1))(\hat{y}_j(k|k-1) - y(k|k-1))^T + R$$

while the cross-covariance between $\hat{x}_a(k|k-1)$ and $\hat{y}(k|k-1)$ is:

$$P_{xy}(k|k-1) = \sum_{j=0}^{2n} W_j^c (\hat{x}_j(k|k-1) - x_a(k|k-1))(\hat{y}_j(k|k-1) - y(k|k-1))^T$$

3. Update from the Measurements

As in the linear Kolman filter, the final state estimation is obtained by correcting the prediction with a feedback on the output prediction error (measured):

$$\hat{x}(k)=\hat{x}_a(k|k-1)+K(\hat{y}(k)-\hat{y}(k|k-1))$$

where gain K is given by:

$$K=P_{xy}(k|k-1)P_y(k|k-1)^{-1}$$

The a posteriori covariance of the estimation is updated with the formula as follows:

$$P_x(k|k)=P_x(k|k-1)-KP_y(k|k-1)K^T$$

The following rules are used to select matrices $P_0$ (covariance of the initial state) and R:
- if the initial state $\hat{x}_a(k)$ at the time k=0 is known, that is $m(0) \approx x_a(0)$, then $P_0^{-1}$ is large,
- if there is much noise in the measurements y(k), then R is small.

It is much more complex to select Q. It is generally chosen in diagonal form, as follows:

$$Q = \begin{bmatrix} Q_x & 0 \\ 0 & Q_m \end{bmatrix}$$

with $Q_m \gg Q_x$.

The method based on the UKF and the random walk model of the wave force according to this implementation can be summarized as follows:
- initializing k=0, state vector $\hat{x}_a(0|0)=m(0)$ and the state of the covariance matrix $P(0|0)=P_0$, at any time k:
  using:
    the measurements of the mobile part's position and velocity y(k)=[δ(k) δ̇(k)] and of the force exerted by the PTO on the mobile part u(k)
    the results of the estimations of the previous step $\hat{x}_a(k-1|k-1)$. $P(k-1|k-1)$
    parameters Q, R (covariance matrices)
  determining the excitation force $\tau_w$ exerted by the incident waves on the mobile part, denoted by $\hat{\tau}_w(k)$ for this embodiment, by carrying out the following steps:
    applying the three steps of the unscented Kalman filter algorithm to obtain $\hat{x}_a(k|k)$, $P(k|k)$ as described above, the complete state being thus estimated with its covariance matrix:

$$\hat{x}(k) = \hat{x}_a(k|k-1) + K(\hat{y}(k) - \hat{y}(k|k-1))$$

$$K = P_{xy}(k|k-1) P_y(k|k-1)^{-1}$$

$$P_x(k|k) = P_x(k|k-1) - K P_y(k|k-1) K^T$$

with $x_a(k)$ being the unknown state vector $$x_a(k) = \begin{bmatrix} x(k) \\ \tau_w(k) \end{bmatrix},$$

$A_a$, $B_a$, $C_a$, $D_a$ matrices of the state-space realization, P being the covariance matrix of the state vector, Q and R being calibration matrices, and
  extracting the last component of the estimated state vector, that is the excitation force $\tau_w$ exerted by the incident waves on the mobile part, by an equation of the form:
    $\hat{w}(k) = [0\ 1]\ \hat{x}_a(k|k)$.

7—Control of the Wave Energy System

This is an optional step. In this step, the wave energy system is controlled to account for the excitation force exerted by the incident waves. It is thus possible to drive the wave energy system in order to optimize the recovered energy.

This step con control the mobile part of the wave energy system, using for example an electrical, pneumatic or hydraulical conversion machine referred to as PTO (Power Take-Off) system. This PTO system influences the motion of the mobile part and allows the mechanical energy to be transferred to the electrical, pneumatic or hydraulical network. Model predictive control (MPC) is an example of a method of controlling wave energy systems.

COMPARATIVE EXAMPLES

The features and advantages of the method according to the invention will be clear from reading the comparative examples hereafter.

For these examples, a flap wave energy system is used as illustrated in FIG. 1, at small scale for basin testing.

The hydrodynamic parameters of the wave energy system are described in Table 1.

TABLE 1

| Hydrodynamic parameters of the wave energy system Hydrodynamic paramenters | | |
|---|---|---|
| Total moment of inertia | $I_{eq} + I_\infty$ | 0.2753 kg · m² |
| Hydrostatic stiffness coefficient | K | 118.25 N · m · rad⁻¹ |
| Drag coefficient | β | 2 N · m · rad⁻¹ · s² |

Furthermore, for the state-space representation of the wave energy system, the following matrices are used:

$$A_r = \begin{bmatrix} -5.1899 & -36.7434 \\ 1 & 0 \end{bmatrix}, B_r = \begin{bmatrix} 1 \\ 0 \end{bmatrix}, C_r = [13.2612\ 0], D_r = 0$$

Figure 2:
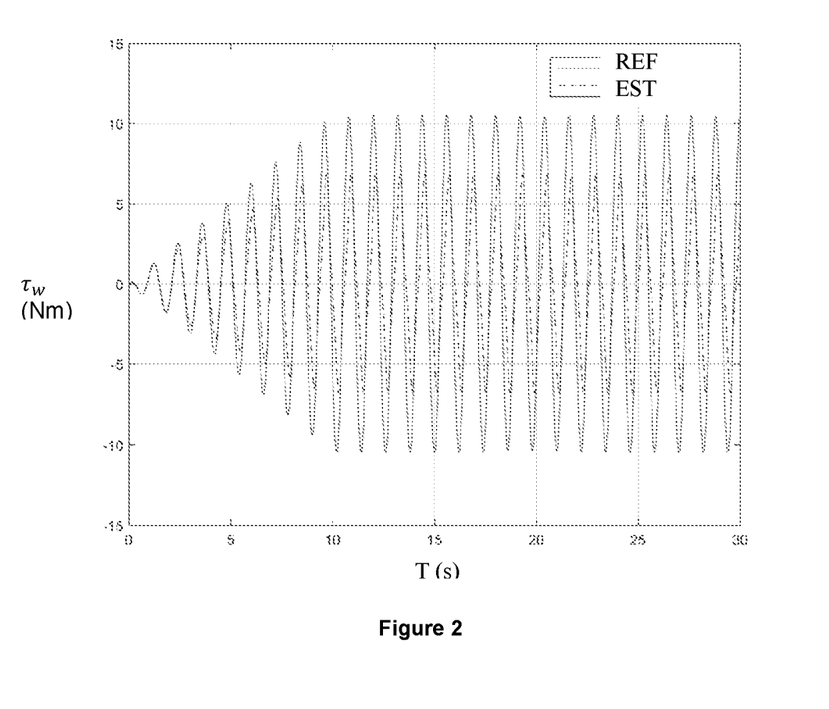
FIG. 2 illustrates an estimation of the force exerted by the waves by use of a method according to the prior art for a regular wove.

First, the excitation force exerted by the waves on the mobile part is determined for this wave energy system by use of the method according to the prior art described in patent application FR-3,049,989, using a linear Kalman filter after linearization of the drag term. FIG. 2 illustrates the curves of the excitation torque r, in Nm exerted by the waves on the mobile part as a function of time T in s, for a regular wave. Curve REF in solid line corresponds to the reference torque really exerted and curve EST in dotted line corresponds to the torque estimated with this method of the prior art. It is observed that the method according to the prior art with the linear Kalman filter gives imprecise results, with an imprecision that increases with the wave amplitude.

Figure 3:
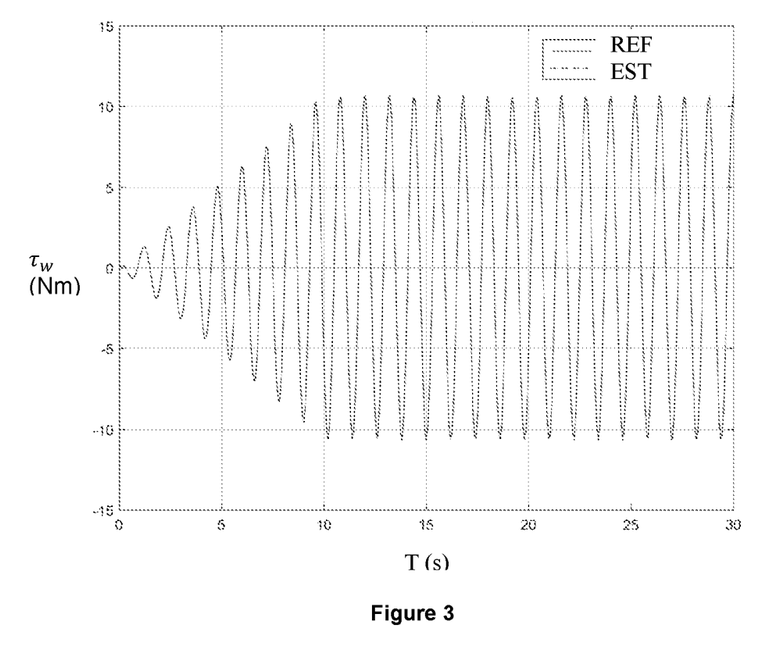
FIG. 3 illustrates an estimation of the force exerted by the waves by use of a method according to an embodiment of the invention for a regular wave.

Second, the excitation force exerted by the waves on the mobile part is determined for this wave energy system by use of the method according to the invention (using an unscented Kalman filter). FIG. 3 illustrates the curves of the excitation torque $\tau_w$ in Nm exerted by the waves on the mobile part as a function of time T in s, for a regular wave. Curve REF in solid line corresponds to the reference torque really exerted and curve EST in dotted line corresponds to the torque estimated with the method according to the invention. Curves REF and EST are superposed, which shows that the method according to the invention allows precise determination of the excitation torque exerted by the waves on the mobile part.

Figure 4:
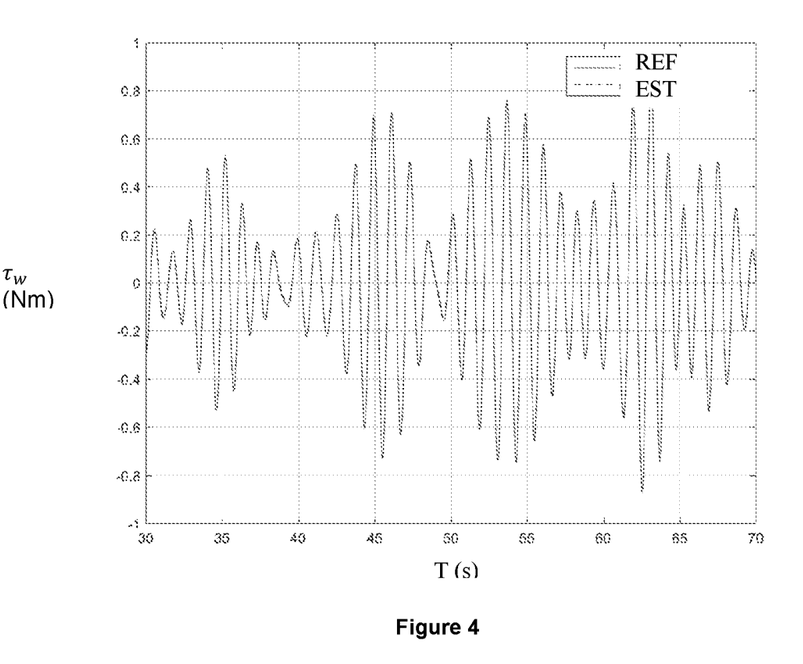
FIG. 4 illustrates an estimation of the force exerted by the waves by use of a method according to an embodiment of the invention for an irregular wove.

Thirdly, the second test of FIG. 2 is repeated for irregular waves. FIG. 4 illustrates the curves of the excitation torque r, in Nm exerted by the waves on the mobile port as a function of time T in s, for an irregular wave. Curve REF in solid line corresponds to the reference torque really exerted and curve EST in dotted line corresponds to the torque estimated with the method according to the invention. Curves REF and EST are superposed, which shows that the method according to the invention allows precise determination of the excitation torque exerted by the waves on the mobile part, even for irregular waves.

The method according to the invention is therefore well suited for precisely determining the excitation force exerted by the waves on the mobile part, in particular of a non-linear wave energy system.

The invention claimed is:

1. A computer method for determining an excitation force exerted by incident waves on a mobile part of a wave energy system, the wave energy system converting wave energy to electrical energy through the mobile part cooperating with a conversion machine, which converts the excitation force exerted by the waves on the mobile part into electrical energy, the mobile part moving with respect to the conversion machine under action of the waves, comprising:
  a) measuring position and velocity of the mobile part by using sensors;
  b) measuring force exerted by the conversion machine on the mobile part by using sensors;
  c) constructing a model of radiation force exerted on the mobile part, the model of radiation force relating radiation force to the velocity of the mobile part;
  d) constructing a model of drag force exerted on the mobile part, the model of drag force relating drag force to velocity of the mobile part;
  e) constructing a dynamic model of the wave energy system relating the excitation force exerted by the incident waves on the mobile part to position of the mobile part, to velocity of the mobile part, to force exerted by the conversion machine on the mobile part, to the radiation force exerted on the mobile part and to the drag force exerted on the mobile part; and
  f) determining the excitation force exerted by the incident waves on the mobile part using the dynamic model, the model of radiation force, the model of drag force, the measured position and the measured velocity, and the measured force exerted by the conversion machine on the mobile part, and using an unscented Kalman filter constructed from a random walk model of the excitation force exerted by the incident waves on the mobile part.

2. The computer method as claimed in claim 1, wherein the dynamic model of the wave energy system is constructed by use of an equation:

$I_{eq}\ddot{\delta}(t) = \tau_{hd}(t) + \tau_{rad}(t) + \tau_d(t) + \tau_w(t) - u(t)$, with $I_{eq}$ being a total moment of inertia of the mobile part, $\delta(t)$ being an angle of rotation of the mobile part with respect to an equilibrium position, with $\ddot{\delta}(t)$ being an angular acceleration of the mobile part and $\dot{\delta}(t)$ being an angular velocity of the mobile part, $\tau_{hd}(t)$ being a hydrostatic restoring moment, $\tau_{rad}(t)$ being a radiation moment, $\tau_d(t)$ being a drag moment, $\tau_w(t)$ being a wave excitation moment and $u(t)$ being a moment exerted by the conversion machine on the mobile part.

3. The computer method as claimed in claim 2, wherein hydrostatic restoring moment $\tau_{hd}(t)$ is determined by use of a formula:

$$\tau_{hd}(t) = -K\delta(t)$$

where K is a hydrostatic stiffness coefficient.

4. The computer method as claimed in claim 3, wherein the radiation force model is constructed by use of an equation:

$\tau_{rad}(t) = I_\infty \ddot{\delta}(t) - \tau_r(t)$, with $I_\infty$ being an added moment of inertia at an infinitely high frequency, and $\tau_r(t) = \int_0^t h(t-s)\dot{\delta}(s)ds = h(t)*\dot{\delta}(t)$, with h being an impulse response relating the velocity of the mobile part to a radiation damping and $\dot{\delta}(t)$ being an angular velocity of the mobile part.

5. A method as claimed in claim 4, wherein the drag force model is constructed by use of an equation:

$$\tau_d(t) = \beta\dot{\delta}(t)|\dot{\delta}(t)|$$

where $\beta$ is the drag coefficient and $\dot{\delta}(t)$ is the angular velocity of the mobile part.

6. A method as claimed in claim 3, wherein the drag force model is constructed by use of an equation:

$$\tau_d(t) = \beta\dot{\delta}(t)|\dot{\delta}(t)|$$

where $\beta$ is the drag coefficient and $\dot{\delta}(t)$ is the angular velocity of the mobile part.

7. The computer method as claimed in claim 2, wherein the radiation force model is constructed by use of an equation:

$\tau_{rad}(t) = I_\infty \ddot{\delta}(t) - \tau_r(t)$, with $I_\infty$ being an added moment of inertia at an infinitely high frequency, and $\tau_r(t) = \int_0^t h(t-s)\dot{\delta}(s)ds = h(t)*\dot{\delta}(t)$, with h being an impulse response relating the velocity of the mobile part to a radiation damping and $\dot{\delta}(t)$ being an angular velocity of the mobile part.

8. The computer method as claimed in claim 7, wherein the drag force model is constructed by use of an equation:

$$\tau_d(t) = \beta\dot{\delta}(t)|\dot{\delta}(t)|$$

where $\beta$ is the drag coefficient and $\dot{\delta}(t)$ is the angular velocity of the mobile part.

9. The computer method as claimed in claim 2, wherein the drag force model is constructed by use of an equation:

$$\tau_d(t) = \beta\dot{\delta}(t)|\dot{\delta}(t)|$$

where $\beta$ is the drag coefficient and $\dot{\delta}(t)$ is the angular velocity of the mobile part.

10. The computer method as claimed in claim 1, wherein the radiation force model is constructed by use of an equation:

$\tau_{rad}(t) = -I_\infty \ddot{\delta}(t) - \tau_r(t)$, with $I_\infty$ being an added moment of inertia at an infinitely high frequency, and $\tau_r(t) = \int_0^t h(t-s)\dot{\delta}(s)ds = h(t)*\dot{\delta}(t)$, with h being an impulse response relating the velocity of the mobile part to a radiation damping and $\dot{\delta}(t)$ being an angular velocity of the mobile part.

11. The computer method as claimed in claim 10, wherein the radiation force model is constructed by use of an equation:

$\tau_{rad}(t) = -I_\infty \ddot{\delta}(t) - \tau_r(t)$, with $I_\infty$ being an added moment of inertia at an infinitely high frequency, and $\tau_r(t) = \int_0^t h(t-s)\dot{\delta}(s)ds = h(t)*\dot{\delta}(t)$, with h being an impulse response relating the velocity of the mobile part to a radiation damping and $\dot{\delta}(t)$ being an angular velocity of the mobile part.

12. The computer method as claimed in claim 10, wherein the drag force model is constructed by use of an equation:

$$\tau_d(t) = \beta\dot{\delta}(t)|\dot{\delta}(t)|$$

where $\beta$ is the drag coefficient and $\dot{\delta}(t)$ is the angular velocity of the mobile part.

13. A method as claimed in claim 1, wherein the drag force model is constructed by use of an equation:

$$\tau_d(t) = \beta\dot{\delta}(t)|\dot{\delta}(t)|$$

where $\beta$ is the drag coefficient and $\dot{\delta}(t)$ is the angular velocity of the mobile part.

14. The computer method as claimed in claim 1, wherein the drag force model $F_d$ is expressed by an equation:

$$F_d(t) = \beta\dot{z}(t)|\dot{z}(t)|$$

with β being the drag coefficient and $\dot{z}$ being the velocity of the mobile part.

15. The computer method as claimed in claim 1, wherein the wave energy system is controlled depending on the determined excitation force $\tau_w$ exerted by the incident waves on the mobile part, by controlling the conversion machine.

16. The computer method as claimed in claim 1, wherein the wave energy system is one of a wave energy system including submerged pressure differential converter device one of a surface floating rotating mass device or a flap device wave energy system.

* * * * *